Oct. 30, 1962  S. F. KAPFF  3,061,723
ANALYTICAL SYSTEM
Filed Nov. 6, 1959
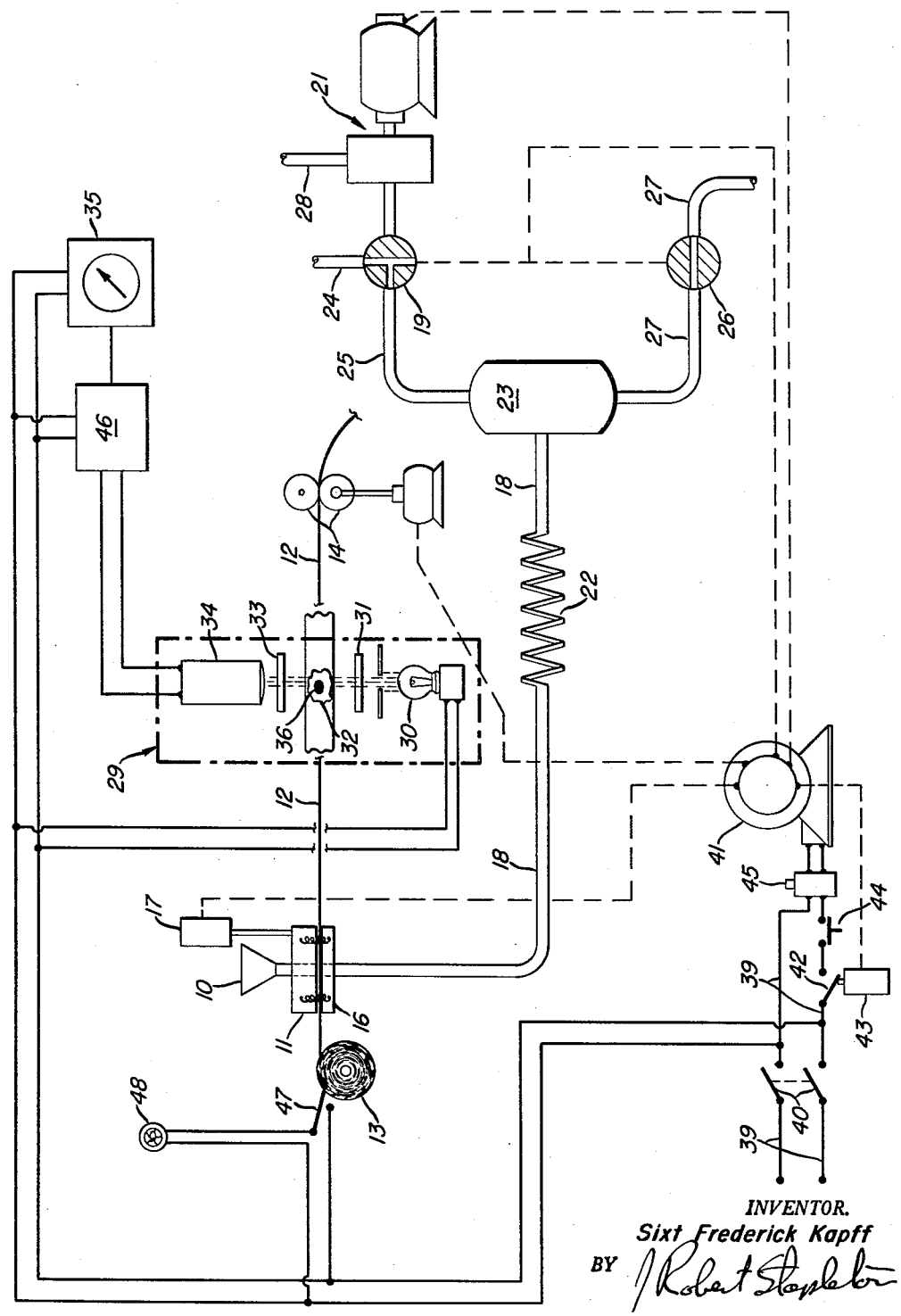
INVENTOR.
Sixt Frederick Kapff
BY *Robert Stappleton*
ATTORNEY United States Patent Office
3,061,723
Patented Oct. 30, 1962

3,061,723
ANALYTICAL SYSTEM
Sixt Frederick Kapff, Homewood, Ill., assignor to Standard Oil Company, Chicago, Ill., a corporation of Indiana
Filed Nov. 6, 1959, Ser. No. 851,339
14 Claims. (Cl. 250—71)

This invention relates to an analytical system for indicating the presence of a fluid dispersed in the body of another fluid and affording a diffusing amount of fluorescence from the body of the other fluid. More particularly, this invention relates to a system for determining the presence of oleaginous contaminants dispersed in the body of an aqueous fluid.

It is often desirable to detect or determine the presence of and/or amount of a fluid dispersed in the body of another fluid. Such determinations are often desirable, for example, to detect the presence of leaks in a process employing water as a cooling or heating agent in chemical processes. For example, in the petroleum industry it is often advantageous or even necessary to determine amounts of petroleum or petroleum products dispersed in the water used during processing. Specifically, the satisfactory operation of a steam generating system requires that the water used be carefully purified. In order to save purified water as much as possible, the purified water is passed through heat exchange equipment and returned to the boilers. The water, which has been processed for purification by removing hardness and corrosive impurities, is in this manner used over and over again. This procedure is satisfactory so long as no leakage of oil occurs into the water stream. When such leakage does occur it is very desirable to discard the water stream before it is returned to the boiler system until the oil leak can be repaired. The presence of any sizable quantity of oil in the water is injurious to the operation of the boiler particularly in that it causes the rapid build-up of a layer of carbonaceous materials on the boiler tube surfaces. The layer of carbonaceous material, being insulating, interferes with rapid heat transfer and, if the layer is sufficiently thick, causes skin temperatures to rise high enough to cause tube failures.

The dispersed fluid usually differs from the body of the other fluid in which it is dispersed by its fluorescing characteristics. For example, petroleum products, as well as most other organic materials, differ in fluorescing characteristics from water in which such products or materials may become dispersed.

An object of this invention is to provide an analytical system which is capable of indicating the presence of a fluid dispersed in the body of another fluid having a differing amount of fluorescence. Another object is to provide such an analytical system that is simple to operate and can be conveniently operated by an unskilled operator. Still another object is to provide such a system capable of indicating the presence of a wide range of concentrations of one fluid dispersed in the body of another fluid. A more specific object is to provide a system capable of determining the presence of very small amounts of the one fluid dispersed in the body of the other fluid in contaminating or impurity amounts. A further object of my invention is to provide a system which gives consistent indications and determinations of such dispersed fluid. Another more specific object is to provide a system for detecting or determining the presence of and/or amounts of a hydrocarbon oil dispersed in oil-contaminated water. Another object is to provide a system which will, in a continuous batch manner, determine the presence of one fluid in another in accordance with the above objects. A still further object is to provide a device and method capable of carrying out the objects mentioned hereinabove. These and other objects of the invention will become apparent from the descriptions herein.

My invention is in part based upon the differing amounts of fluorescence emitted by certain fluids. The invention provides a system capable of indicating the presence of a fluid dispersed in the body of another fluid and affording a differing amount of fluorescence from the body of the other fluid. Briefly, the system includes a suitable filter material through which a sample may be forced by a sample forcing means so that the sample becomes absorbed on an area of the surface of the filter material. An indicator is provided adapted for indicating differences in fluorescence within the boundaries of the area where the sample has been absorbed on the surface of the filter material. The indications of differences in fluorescence are taken as a determination of dispersed fluid in the sample. The system is operable to detect and measure the presence of the dispersed fluid in concentrations as low as one part per million or less.

In practicing my present invention, the sample to be tested is forced through a filter material, such as a filter tape, leaving absorbed or deposited upon the filter material a spot area where the dispersed fluid, if any dispersed fluid is present, will concentrate, and surrounding the spot area, an area of other fluid of the fluid body is also absorbed or deposited on the filter material. Filtering the sample through the filter material concentrates the dispersed fluid in the spot area on the surface of the filter material. The spot area on the filter surface is then subjected to the influence of ultraviolet light and the fluorescense of the spot area under ultraviolet light is detected by a visible light detector as a measure of the amount of oil deposited in the spot area. Standard size samples of the oil contaminated water are used and therefore the fluorescence of the spot area is a measure of the concentration of the dispersed fluid in the body of the other fluid. The area surrounding the spot area wherein the other fluid is absorbed is also subjected to the influence of ultraviolet light and its fluorescence is measured in the same manner and used as a control measurement for the spot area fluorescence measurement.

The device of this invention includes a filter material, such as a filter tape, through which a sample of the fluid body to be tested is forced by a sample forcing means. The filter material is held in place during the filtering operation. After the filtering operation, the filter material is moved to a zone of influence to ultraviolet light and the fluorescence of the spot area and surrounding area are both measured by an ultraviolet light source and visible light detector as set out above. The relative amount of fluorescence of the spot area in comparison with the fluorescence of the surrounding area is taken as a direct indication of the amount of the dispersed fluid in the fluid sample.

As further description of the system of this invention, a typical illustration is the analysis of a sample of a fluid body suspected of containing a dispersed fluid affording a different amount of fluorescence from the fluid of the fluid body. Because the system of this invention is particularly useful in analyses of hydrocarbon oils dispersed in water, this illustration uses a sample of a body of water suspected of containing oil;

however, it is to be understood that a sample of any fluid body suspected of containing a dispersed fluid affording a different amount of fluorescence from the fluid of the fluid body can be substituted for the water sample. The analysis is commenced by forcing the sample through the filter material. After the water sample is sucked or forced through the filter material, if any oil is present in the sample, the oil will accumulate and remain behind as a spot on the filter material. When the spot is then illuminated with an ultraviolet source such as an ultraviolet light from which all light in the visible portion of the spectrum has been removed by a suitable filter providing, for example, ultraviolet light of a wave length of about 280 to 380 m$\mu$ if oil is present on the filter material, the oil fluoresces emitting light in the visible portion of the spectrum. The visible light if recognized by a detector, such as a photoelectric cell equipped with a filter which transmits visible light but rejects ultraviolet light. Thus, for light from the ultraviolet source to reach the photocell, it must be converted to a different wave length. If no oil is present, no conversion can occur in the spot area and no signal is received by the photocell. If oil is present, the brilliance of the fluorescence is a function of concentration. The output from the photocell is fed into a readout device, such as a recorder, for reading or recording the output as a function of brilliance and, therefore, as a function of concentration of oil present. Advantageously, the system may compensate for zero fluorescence by taking a comparative control reading of the water-wet filter material in the area surrounding the spot area due to water adsorbed while forcing the sample through the filter material. The filter material may be dried if desired prior to the readings without materially affecting the results. In such cases, the control reading is taken in the surrounding area around the spot area from which surrounding area the water has been removed.

The analysis may be accomplished on any body of fluid wherein it is suspected that there may be dispersed another fluid affording a differing amount of fluorescence. The dispersed fluid may be a relatively fluorescent fluid insoluble in the body of fluid which is relatively non-fluorescent in comparison with the dispersed fluid. Also, the dispersed fluid may be relatively non-fluorescent while the fluid body is relatively fluorescent. The fluorescent fluid may be any organic fluid and advantageously an oleaginous fluid or oil, such as a hydrocarbon oil. The organic fluids, because of their organic nature, are more highly fluorescent than such inorganic fluids as water. Thus, the invention is particularly useful in indicating the presence of water-insoluble fluid organic oleaginous materials dispersed in water or the like. The preferred embodiment of the present invention is adapted for use in detecting and measuring contaminating amounts of oil in water streams and supplies and other water bodies. Therefore, the descriptions herein are concerned mostly with oil and water but are applicable to other fluids as hereinabove stated. The sample of oil-contaminated water forced through the filter material should be of such size to deposit sufficient oil for detection. Solids, if present in appreciable amounts, should be removed from the sample by filtering or settling since they will usually affect the fluorescence. A larger sample increases the sensitivity of the device proportionally to the larger amount of oil deposited from the sample. The sample may conveniently be held in a sample holder such as a cup, tube, cylinder, bulb, or the like, which advantageously may have graduated measuring marks for determining the proper amount of sample. Further, the sample holder is advantageously interchangeable with like sample holders to allow clearing between tests on different samples and thereby eliminate contamination of a later sample by portions of the sample adhering to the sample holder walls. The sample is forced from the sample holder and through the filter material by the sample forcing means.

The sample forcing means may be any means for forcing the sample through the filter material preferably at a rate substantially faster than gravity flow. The sample forcing means may, for example, be a slidable piston within the sample holder and in substantial pressure sealing relation with the inner walls of the sample holder arranged so that when the piston is forced into the sample holder, the sample is in turn forced from the sample holder and through the filter material. In such an arrangement, the sample holder and piston basically form a piston operated syringe and it is fully intended that such piston operated syringes are useable as a combined sample holder and sample forcing means. Bulb-type and other types of syringes may also advantageously be employed. As another example, the sample forcing means may be a slidable cap or flexible diaphragm over the sample holder, pressure on which forces the sample through the filter material. Such embodiments may be actuated with solenoids responsive to electrical impulses or may be hand operated. However, in order to assure that substantially the total measured sample is forced through the filter material for a more accurate determination of oil content, where desirable, the sample forcing means is a suction means using a pump means to draw the sample from the sample holder through the filter material and into a sump from which the sample may be discharged as waste or returned to the water supply from which it was taken. The preferred arrangement allows ease of operation in that after placing the sample in the sample holder it can be immediately sucked through the filter material without the necessity of placing a plunger, cap, bulb or the like on the sample holder in order to apply the desired force. Also, the suction of air through the sample holder by using the pump arrangement further assures complete removal of the sample from the cup so that substantially all of the sample passes through the filter material and so that substantially no sample is left in the sample holder to contaminate subsequent samples. The air sucked through after the sample may also serve to dry the filter material where drying is desirable before reading the spot and surrounding area with the indicator means. A blower may also be provided to dry the filter material. In all embodiments of the sample holder and sample forcing means and in any conduits therefrom to the filter material, where precision in measurement is desired, it is essential that the surfaces in contact with the sample be designed so that substantially complete flow of the sample through the filter material be provided so that each sample tested is of the same volume for comparable tests and so that carry-over and contamination of a subsequent sample is avoided. Further, such surfaces are preferably constructed of rust proof materials such as stainless steel, brass, synthetic plastics, Bakelite, glass, aluminum, and the like, to prevent the formation of rust which may contaminate the sample and adversely affect accuracy of readings due to fluorescence of rust particles. If synthetic plastics are used, they must be of a type which do not remove the oil or other fluorescent fluids on their surfaces.

The analysis may be accomplished on any body of fluid wherein it is suspected that there may be dispersed another fluid affording a differing amount of fluorescence. The dispersed fluid may be a relatively fluorescent fluid insoluble in the body of fluid which is relatively non-fluorescent in comparison with the dispersed fluid. Also, the dispersed fluid may be relatively non-fluorescent while the fluid body is relatively fluorescent.

The suitable filter material may be any filter material capable of retaining at least some of the dispersed fluid on its surface. Typical examples of such filter materials are cloth, fiber glass, synthetic fabrics, sintered materials, paper, and the like. A sufficiently strong filter material should be selected to remain intact under the force of the volume of sample to be forced therethrough. The preferred form of the filter material is a strip or web on tape for use in the present system and is herein referred to as a filter tape. Paper filter tapes are particularly preferred because of their availability and low cost. Sufficiently strong paper filters to withstand most pressures necessary to force the sample are commercially available in excellent quality. The filter material should not have uneven areas of differing fluorescence on its surface.

Preferably, during the forcing of the sample through the filter material, filter material holding means are provided to hold the filter material in position to assure that the sample passes through the filter material without substantially bypassing it. In the preferred embodiment using the filter tape, the holding means clamps the tape in a filtering position against the outlet of the sample holder or conduit therefrom while the sample is being forced therethrough. The holding means is provided with a means for releasing the filter tape so that the tape with the spot and surrounding area formed at the filtering position may be moved to position the spot under the indicator means.

Although the filter material may be moved by hand, in the preferred arrangement where the filter material is of a tape-like arrangement, it is preferred to move the tape by other filter tape advance means such as a motor driven advance means. The motor driven means may be a motor driven wheel pressed against the tape or may be a pair of coasting rollers, one on each side of the tape, driven by a motor. A motor driven take-up reel may be used to move the tape from a supply reel to the filtering position, then to the reading position and then onto the take-up reel. However, a drive roller is preferred as a tape advance to move the tape from position to position to assure uniform movement for each run. The reading position is the position at which the spot is positioned for reading by the indicator means. Advantageously, there may be two reading positions, i.e. (1) a control reading position where the area surrounding the spot is ready for a zero reading for comparing with the spot reading, and (2) a spot reading position where the fluorescence of the spot is determined and translated as set out hereinabove. While the reading or readings, are being taken, the sample holder may be cleaned in situ by washing with a suitable solvent and/or blown with air or other gases, or, if the sample holder is replaced or if cleaning is unnecessary, a new sample may be forced through the filter tape at the filtering position, as above.

The indicator means advantageously comprises an ultraviolet light source, a visible light detector, and measuring means for measuring the fluorescence detected by the visible light detector. The ultraviolet light source may be any such source which is capable of emitting ultraviolet light and substantially no visible light. The visible light may be filtered from the ultraviolet light with a suitable visible light filter. Such filters are commercially available, e.g. Wratten Filter 18A marketed by Eastman Kodak Co. The visible light detector may be any such detector which is responsive to visible light but not appreciably responsive to ultraviolet light. The detector may be, for example, a photometer such as a photoelectrical cell or photocell coupled with a suitable ultraviolet light filter (e.g. Wratten K2 marketed by Eastman Kodak Co.) for filtering ultraviolet light from the light signals being received. Measuring means responsive to the detector are also provided to read out the results as detected. The measuring means may simply be a galvanometer for detecting output from the photometer detector or more advantageously may be a recorder which provides a permanent record of the detector output. The photometer detector and light source may be positioned opposing each other with the filter tape between them, in which position the light is emitted through the filter tape and conversion of ultraviolet to visible light is detected at the side of the tape opposite to the light source; or the photometer detector and light source may be positioned on the same side of the tape so that the photometer detector senses the conversion to visible light by reflection from the areas on the tape within the zone of detection by the indicator means.

Reference is now made to the FIGURE which illustrates a preferred embodiment of this invention. The device of the FIGURE is illustrated with the filter tape in the process of moving from the controlled reading position to the spot reading position. Sample holder 10 is provided in sample holder mount 11 and, in the illustrated embodiment, is a non-graduated sample holder having a funnel like configuration. Filter tape 12 is a strong paper filter tape capable of withstanding the force of the sample through it. The particular paper used was a #4 Whatman Filter Paper, 1½" wide x 4½" O.D. x 2½" I.D. roll, marketed by Research Appliance Corp., Pittsburgh, Pennsylvania. The filter tape is supplied by tape supply roll 13 and after the tests the tape is removed from the device by tape advance 14. During the filtering operation, solenoid 17 is deactivated to allow mount 11 to be forced downward by springs against plate 16 to form a clamp with plate 16 holding filter tape 12 in fixed position for the filtering operation. Tight fitting of the clamping elements against the filter tape is provided to minimize leakage of sample at the tape. Conduit 18 is provided to conduct the residue of tested samples away from the filter tape. In operation, a measured sample is charged to sample holder 10. Sample holder 10 is an overflow cup having about a 120 ml. capacity. It may also be desirable to measure samples before pouring them into the sample holder. A graduated sample holder may also be used for measurement of the sample in the sample holder. Where either a graduated or overflow sample holder is used, the sample holder may be provided with a valve which may conveniently be operated with a solenoid arrangement to hold the sample within the sample holder for accurate measurement thereof before it is forced through the filter tape. Because solenoid control arrangements for holding the sample are normally highly conducive to rusting, the solenoid arrangement is not preferred. In the FIGURE, and the preferred embodiment, an overflow cup is used as a sample holder. The sample is held in the overflow cup and kept from flowing by gravity through the tape by a column of air in conduit 18 maintained by electrically operated valve 19 which is in the suction position during sample charging and electrically operated valve 26 which is in the shut position during sample charging. In the illustrated embodiment the sample charged to the sample holder is directly sucked through the tape and into conduit 18. The sucking force is obtained with electrically operated pump valve 19 in the suction position and valve 26 in the shut position by starting motor driven pump 21 provided with pump vent 28. The pump may be any known air pump having sufficient force to suck the sample through the filter tape and we have found the Redmond air pump, Model 3554, Type L, marketed by Fisher Scientific Co., to be particularly adaptable for this use. The sample is sucked through conduit 18 attached to plate 16 and through capillary 22 and into sump 23 where the sample residue collects as a liquid phase. Capillary 22 is provided for the purpose of defining the rate at which the sample is drawn through the paper. After sucking the sample through filter tape 12, pump 21 is shut off, and pump valve 19, a three-way-valve, is switched to the vent position which opens vent 24 for venting sump 23 through conduit 25. Drain valve 26, two-way-valve, is opened to drain sump 23 through conduit 27. Filter tape 12 is released from its clamped position by activating solenoid 17 and upon release of the filter tape, motor driven tape advance 14 is actuated to move the filter tape longitudinally to the control reading position wherein the area surrounding the spot area is in the zone of detection of the indicator means, indicator assembly 29. Indicator assembly 29 contains a photocell 34, a light source 30, and filters 31 and 33 as will be further described below. Motor driven tape advance 14 is then stopped in a control reading position. In the control reading position, fluorescent light 30 emits through filter 31 which filters substantially all visible light from the emissions impinging on filter tape 12 in the water-wet surrounding area 32 of the filter tape, which area is the area surrounding spot area 36. The amount of conversion of ultraviolet light to visible light as the ultraviolet light passes through surrounding area 32 is detected by photocell 34 through filter 33 which filters out all ultraviolet light. The photocell and/or light source is provided with a diaphragm if necessary, to restrict the field of emission and/or detection so that the spot area and surrounding area may each be individually read without substantial overlapping of areas within the field of detection. Acceptable photocells are readily available commercially and are well known to those skilled in the art; an example of a satisfactory photocell is the Photovolt Electronic Photometer, Model 501–M, marketed by Photovolt Corporation. Photocell 34 actuates recorder 35 to record the output of photocell 34 as a control or zero reading. Many satisfactory recorders are available commercially; in the illustrated specific embodiment, for example, I found the Varian G11 Strip Chart Recorder, marketed by Varian Associates, highly satisfactory. Amplifier 46 is provided on the output of photocell 34 to amplify the output and thereby provide a wider variation of readings on recorder 35. The filter tape is then released by activating solenoid 17. The paper is moved longitudinally by motor driven tape advance 14 as before and is stopped when the spot area comes within the zone of detection of indicator assembly 29 in spot reading position. The spot area is read in the same way as the surrounding area had previously been read.

The illustration of the FIGURE shows the device with the filter tape holding mechanism open and the tape in the process of moving to the spot area reading position. It is also intended that the spot area may be read prior to the surrounding area reading since the surrounding area completely surrounds spot area and may be read through either anteriorly, posteriorly or laterally to the spot area with reference on the filter tape. While the spot area and/or the surrounding area are being read, the sample holder may be replaced with a clean sample holder. Valve 19 is turned to the suction position and valve 26 is closed and pump 21 is started. The new sample is charged to the sample holder and is forced through the filter tape. To provide continuous sample testing, a fresh sample may be forced through the filter tape while a prior sample is being read.

It is evident that other embodiments of this invention can be designed with reference to the herein contained disclosure by those skilled in the art using ordinary mechanical skills. For example, the indicator assembly can be provided with two sets of light sources and photocells for making the control reading and spot reading at the same time. In such an arrangement it is highly advantageous to get photocells having sufficiently balanced outputs to provide comparable readings.

The sample holder may be cleaned with suitable solvents. For cleaning, it is preferred that readily evaporable solvents or substantially non-fluorescent solvents be used to eliminate the introduction of fluorescence into the subsequent samples. Cleaning the sample holder is unnecessary where the device is being used to monitor a water stream for the appearance of traces of oil contaminants. In such a use subsequent samples may be continually charged to the sample holder. Because it is the first appearance of oil that is desired to be detected, carryover from one sample to the next makes no difference.

The herein described system may be suitably controlled for automatic operation in accordance herewith. Accordingly, with reference to the FIGURE, the system illustrated is controlled by a clock timing device. In the FIGURE, the automation circuitry is electrically energized by on-off switch 40 in power line 39. When switch 40 is turned on, light source 30, recorder 35 and amplifier 46 are immediately energized for warmup. Solenoid 17 is also energized. A compartment (not shown) having a door (not shown) may conveniently be provided to house sample holder 10 in order to insure keeping contaminants out of the samples. In the circuitry as shown in the FIGURE, door switch 42 is provided to control all elements of the circuitry other than the ultraviolet lamp, amplifier, and tape supply indicator which will be discussed below. Door switch 42 closes when the door to the compartment is closed and energizes the test switch 44 so that the device can be operated only if the door is closed. Test switch 44 is a push button and is used to start each individual test run. Test switch 44 actuates timer solenoid 45 which causes a momentary delay, starts timer motor 41 and actuates door solenoid 43 which locks the compartment door and door switch 42 closed. Timer motor 41 controls the other elements in the device in a timed sequence to provide automatic testing as will be apparent from the following. Timer motor 41 deactivates solenoid 17 causing filter 12 to be held in filtering position. At about the same time timer motor 41 closes drain valve 26, starts motor driven pump 21 and switches three-way valve 19 to the suction position. After sufficient time for completely sucking the sample through filter tape 12, timer motor 41 turns off motor driven pump 21, opens drain valve 26, and switches pump valve 19 to the vent position. Timer motor 41 then activates solenoid 17 to release the filter tape and energizes motor driven tape advance 14 to move the filter tape from the filtering position to the control reading position wherein the area surrounding the spot area is in position for reading by photocell 34. The timer motor 41 then deactivates tape advance 14 with filter tape 12 in the control reading position. The signal from photocell 34 is amplified by amplifier 46 and recorded by recorder 35. Timer motor 41 then causes filter tape 12 to move to the spot reading position in the same manner as before and a test reading of the spot is taken and recorded. Timer motor 41 finally releases the compartment door lock by de-energizing door solenoid 43 so that the door may be opened and a fresh sample added. The test on the fresh sample is run in the same manner and a continuous operation is thereby provided wherein the device is automatically controlled and each test be started simply by closing test switch 44 while the compartment door is closed.

Tape switch 47 and indicator lamp 48 are provided to determine when a new supply of filter tape is needed for filter tape supply roll 13. When roll 13 decreases below a predetermined size, tape switch 47 automatically closes and indicator lamp 48 is turned on to indicate a low supply of filter tape.

Using the instrument provided with automatic control means as described in the FIGURE, above, tests one various oil and water combinations were made in order to determine the ability of the device to differentiate between concentrations of oil in the water and in order to determine the consistency of readings on a given concentration. The samples listed in the table below each consisted of about 120 ml. The composition of each sample was known and parts p.p.m. of oil in each sample are listed in the table. Control readings and test readings were taken for each sample in accordance with the procedure set out above. The results of the readings are recorded in the table.

Table

| Run No. | Oil Content of Sample, p.p.m. | Instrument Readings | |
|---|---|---|---|
| | | Control | Spot Area |
| 1 | 0.0 | --------- | 0.0 |
| 2 | 0.6 | 0 | 34 |
| 3 | 0.6 | 0 | 32 |
| 4 | 1.2 | 2 | 55 |
| 5 | 1.2 | 2 | 54 |
| 6 | 6.8 | --------- | 74 |
| 7 | 6.8 | --------- | 83 |
| 8 | 6.8 | --------- | 79 |
| 9 | 13.5 | --------- | off chart |

High concentrations, such as in run No. 9, can be tested by desensitizing the indicator. This can be done, for example, by removing or decreasing the power of the amplifier on the photocell output or, to some extent, by the simple expedient of using smaller sample volumes.

Other control means than those specifically set out herein may be advantageously used. For example, the filter tape itself may act as the control mechanism using marks on its edges to trip photoelectric detector devices and control the sequencing of steps in response to output from the photoelectric cells. However, such an arrangement is not preferred because of the increased expense and the possibility of failure of the photoelectric cells.

It is preferred to use a motor driven timer and any such timer, including a clock driven timer, is suitable for programing the automation of this device. Such timers are well known in the art. In the embodiment set out in the FIGURE, I used Industrial Timer Model RC-6 marketed by Industrial Timer Corp., which timer proved highly satisfactory. However, many other timer mechanisms which are equally satisfactory are available commercially and any such timer suitable for the automation of this device may be used.

An advantage of the system herein described is its extreme sensitivity in detecting and measuring contaminating amounts of oil in water. I have found, through actual experimental tests with the device that it is able to detect the presence of less than 1 p.p.m. of oil in a 50 cc. water sample. The device also has excellent repeatability when safeguards, as outlined above, are taken for eliminating contamination of samples. Repeatability is particularly excellent at lower concentrations of contaminants.

It is evident from the above I have provided an analytical system for indicating the presence of a fluid dispersed in the body of another fluid and affording differing fluorescence from the other fluid, and, more particularly, for determining oil in oil-contaminated water. Therefore, having herein particularly described and illustrated an embodiment of my invention,

I claim:

1. A system for indicating the presence of a fluid dispersed in the body of another fluid and affording a differing amount of fluorescence from the body of the other fluid, which system comprises a suitable filter material, fluid sample forcing means for forcing a sample of said body of fluid through said filter material whereby said sample is absorbed on an area of the surface of said filter material, and indicator means adapted for indicating differences in fluorescence within the boundaries of said area.

2. An analytical system for indicating the presence of a fluid dispersed in the body of another fluid and affording a differing amount of fluorescence from the body of the other fluid, which system comprises a filter material capable of retaining dispersed fluid on its surface, means for forcing a fluid sample of said body of fluid through said filter material whereby a spot consisting essentially of dispersed fluid and a substantially separate area consisting essentially of said other fluid are formed on the surface of said filter material, an ultraviolet light source for irradiating said spot and said area, a visible light detector positioned to respond to emitted visible light from said spot and area and measuring means responsive to said detector for measuring the amount of said dispersed liquid in the sample as a direct measure of the difference in fluorescence of said spot and said area.

3. The system of claim 2 wherein said ultraviolet light source comprises an ultraviolet-emitting light coupled with a visible light filter for filtering visible from the radiation before irradiating said spot and area and said visible light detector comprises a visible light sensitive photometer coupled with an ultraviolet light filter for filtering ultraviolet light from said emitted visible light.

4. The system of claim 2 wherein said filter material is a filter tape.

5. The system of claim 2 wherein the dispersed fluid is relatively fluorescent and the fluid of the body of other fluid is relatively non-fluorescent.

6. An analytical device for determining the presence of fluorescent fluid in a substantially non-fluorescent fluid sample which system comprises a suitable filter material, fluid sample forcing means for forcing a fluid sample of said substantially non-fluorescent fluid containing said fluorescent fluid through said filter material, whereby a spot of fluorescent fluid and a substantially separate area of substantially non-fluorescent fluid are absorbed on said filter material, and indicator means for indicating the relative amount of fluorescence of said spot to fluorescence of said area as a direct indication of the amount of said fluorescent fluid in said fluid sample.

7. A device for determining the presence of an oleaginous fluorescent fluid in a substantially non-fluorescent aqueous fluid sample which device comprises a movable filter tape, holding means for positioning said filter tape in a filtering position, means for forcing a fluid sample of substantially non-fluorescent aqueous fluid containing fluorescent oleaginous fluid contaminants through said filter tape whereby a spot of said oleaginous fluid and a substantially separate surrounding area of said aqueous fluid are deposited on said filter tape, means for releasing said filter tape from said holding means, drive means for intermittently moving said movable filter tape from said filtering position to a reading position, indicator means at said reading position for indicating the relative amount of fluorescence of said spot to fluorescence of said surrounding area as a direct indication of the amount of said fluorescent fluid in the fluid sample.

8. The device of claim 7 including in addition, means for stopping said movable tape and holding said movable tape in said reading position.

9. A system for testing a predominantly aqueous fluid for the presence of small amounts of fluorescent oleaginous fluid contaminants which system comprises a filter tape, holding means for holding said filter tape in a filtering position, fluid sample forcing means for forcing a sample of said predominantly aqueous fluid through said filter tape in said filtering position, whereby a spot of said oleaginous fluid contaminants and a surrounding separate area of said aqueous fluid are absorbed on said filter tape, means for releasing said holding means, driving means for intermittently moving said movable filter tape from said filter position, means for momentarily stopping said filter tape at a zero reading position and at a spot reading position, indicator means at said zero reading position and said spot reading position for indicating the relative amount of fluorescence of said spot to fluorescence of said surrounding area as a direct indication of the amount of said fluorescent fluid in the fluid sample.

10. A device for determining the presence of oil in a predominantly aqueous fluid sample which device comprises a rust-resistant sample holder, a suction filtering means, rust resistant conduit means from said sample holder, a filter tape positioned between said suction filtering means and an outlet from said conduit means whereby said suction filtering means is capable of suctioning fluid from said conduit through said filter means, solenoid means for holding said movable filter tape in a filtering position for applying suction to said fluid sample by said suction filtering means while said filter tape is in said filtering position whereby said fluid sample in said sample holder is forced through said filter tape whereby a spot of oil and surrounding area of water are adsorbed on said filter tape, drive means for moving said filter tape to a reading position, means for stopping said filter tape at said reading position, indicator means for indicating the fluorescence of the spot and surrounding area absorbed on said filter paper in said filtering position, and readout means responsive to said indicating means for recording the comparative fluorescence of said spot and said surrounding area as a determination of the presence and amount of oil in said sample.

11. The device of claim 10 wherein said suction means comprises a suction pump positioned to draw said sample through said filter tape at said filtering position, a sump for collecting said fluid sample after filtering, a valve for draining said fluid sample from said sump and a vent for venting said sump while draining.

12. The device of claim 10 wherein said sample holder is an overflow cup.

13. The device of claim 10 wherein said conduit from said sample holder is intermittently provided with a column of air for holding said fluid sample in said sample holder.

14. The device of claim 10 wherein said conduit from said sample holder is equipped with a solenoid valve for holding said fluid sample.

References Cited in the file of this patent

UNITED STATES PATENTS

| | | |
|---|---|---|
| 2,110,310 | Shayer | Mar. 8, 1938 |
| 2,113,063 | Stryker | Apr. 5, 1938 |
| 2,297,939 | Campbell | Oct. 6, 1942 |
| 2,551,281 | Moses | May 1, 1951 |
| 2,591,737 | Souther | Apr. 8, 1952 |
| 2,602,729 | Curry | July 8, 1952 |
| 2,741,544 | Chaikin | Apr. 10, 1956 |